(12) United States Patent
Koutensky et al.

(10) Patent No.: US 8,674,615 B2
(45) Date of Patent: Mar. 18, 2014

(54) CONTROL APPARATUS FOR LED DIODES

(75) Inventors: Pavel Koutensky, Prague (CZ); Ales Loidl, Mukarov (CZ); Jiri Smutka, Prague (CZ); Jakub Hajek, Susice (CZ)

(73) Assignee: STMicroelectronics Design and Application S.R.O., Prague (CZ)

( * ) Notice: Subject to any disclaimer, the term of this patent is extended or adjusted under 35 U.S.C. 154(b) by 149 days.

(21) Appl. No.: 13/346,531

(22) Filed: Jan. 9, 2012

(65) Prior Publication Data

US 2012/0176057 A1 Jul. 12, 2012

Related U.S. Application Data

(63) Continuation of application No. 13/193,388, filed on Jul. 28, 2011, now abandoned.

(30) Foreign Application Priority Data

Jul. 28, 2010 (IT) .............................. MI2010A1397

(51) Int. Cl.
*H05B 37/00* (2006.01)

(52) U.S. Cl.
USPC ........................................................ 315/219

(58) Field of Classification Search
USPC ............. 315/200 R, 201, 186, 210, 219, 228, 315/250, 254, 294, 297, 307, 308
See application file for complete search history.

(56) References Cited

U.S. PATENT DOCUMENTS

| | | | | |
|---|---|---|---|---|
| 8,102,683 B2 * | 1/2012 | Gaknoki et al. | ........... | 363/56.11 |
| 8,242,766 B2 * | 8/2012 | Gaknoki et al. | ............... | 323/300 |
| 8,278,832 B2 * | 10/2012 | Hung et al. | .................... | 315/219 |
| 8,294,377 B2 * | 10/2012 | Kang et al. | .................... | 315/219 |
| 8,415,890 B2 * | 4/2013 | Kang et al. | .................... | 315/219 |
| 8,456,108 B2 * | 6/2013 | Kimura et al. | ................ | 315/307 |
| 8,462,523 B2 * | 6/2013 | Gaknoki et al. | ........... | 363/56.11 |
| 2006/0192502 A1 | 8/2006 | Brown et al. | | |
| 2008/0258647 A1 | 10/2008 | Scianna | | |

(Continued)

FOREIGN PATENT DOCUMENTS

| | | |
|---|---|---|
| EP | 2288028 A1 | 2/2011 |
| WO | 2010/027254 A1 | 3/2010 |

OTHER PUBLICATIONS

Rand, D., "Issues, Models and Solutions for Triac Modulated Phase Dimming of LED Lamps," IEEE Power Electronics Specialists Conference, Orlando, FL., pp. 1398-1404, Jun. 17-21, 2007.

*Primary Examiner* — Vibol Tan

(74) *Attorney, Agent, or Firm* — Seed IP Law Group PLLC

(57) ABSTRACT

A control apparatus for LED diodes includes a dimmer TRIAC electrically connected in series between a power supply and a LED lighting converter. The converter comprises a transformer, with a primary winding coupled with an input terminal and a secondary winding coupled with an output terminal, and a switch coupled to the primary winding to regulate the current through the primary winding and regulate the output voltage. The apparatus comprises a control device adapted to control said switch determining the on period and the off period of the switch to maintain constant the output current to supply said LED diodes. The apparatus comprises a detector connected to the secondary winding of the transformer and adapted to detect the conduction angle of the TRIAC; the control device is adapted to regulate the output current to supply said LED diodes in response to the TRIAC conduction angle detected by the detector.

15 Claims, 6 Drawing Sheets

(56) References Cited

U.S. PATENT DOCUMENTS

2010/0090618 A1 4/2010 Veltman
2010/0134038 A1 6/2010 Shackle et al.
2012/0176057 A1* 7/2012 Koutensky et al. .......... 315/210

* cited by examiner

CONTROL APPARATUS FOR LED DIODES

BACKGROUND

1. Technical Field

The present disclosure refers to a control apparatus for LED diodes.

2. Description of the Related Art

Control devices for LED diodes are known in the art. Some of these devices include a dimmer. The dimmers are known in the art for regulating the light intensity of a light load, for example an incandescent bulb. As shown in FIG. 1, a known circuit for control a light load comprises a dimmer 1 electrically connected in series between an electrical load 2 and the power source 3, for example an AC household current. Dimming is obtained by adjusting the conduction angle of the dimmer 1 so that the RMS voltage across the load 2 varies with the adjustment of the conduction angle.

A dimmer comprising a TRIAC device is commonly known in the art. The last has generally a first main terminal, a second main terminal and a gate terminal. The TRIAC exhibits the following characteristics:

Bidirectional conduction through the main terminals, allowing AC to pass through;

The TRIAC is turned in and conduction is present between the main terminals when there is a trigger current present between gate terminal and the second main terminal;

Once triggered, the TRIAC remains on until a zero crossing of the AC power line at which point the device turns off and awaits the next trigger pulse or zero crossing of the AC power line. This characteristic allows phase angle control to be obtained.

Also the TRIAC does not remain in the on state after triggering without a current higher than the hold current passing through the main terminals; therefore the TRIAC has difficulty remain on when a low current is drawn through the main terminals, such as in the case of LED lighting.

At lower current levels, once the dimmer conducts, the load current does not satisfy the hold current requirement of the TRIAC and the dimmer enters a retriggering state that causes flickering of the LED light.

Moreover dimmable LED lighting uses an electronic AC to DC converter to operate, preferably a switching mode power supply that converts the AC input voltage to low voltage and high current to drive the LED diodes.

The dimmer has a low bias current as its power supply and the LED lighting load as to provide such low current; the electronic converter instead has a very low current consumption. This prevents the dimmer circuit from firing properly again causing ringing.

FIG. 2 is a lighting apparatus that includes a control circuit 4 for controlling LED diodes and a dimmer 1 according to prior art.

BRIEF SUMMARY

One embodiment of the present disclosure is a control apparatus for LED diodes that overcomes the above mentioned drawbacks.

One embodiment of the present disclosure is a control apparatus for LED diodes comprising a dimmer electrically connected in series between a power supply and a LED lighting converter, said converter having input terminals coupled with the dimmer and outputting a direct output voltage with a constant output current to supply said LED diodes, said converter comprising a transformer with a primary winding coupled with the input terminal and a secondary winding coupled with the direct output voltage and a switch coupled to the primary winding to regulate the current flowing through the primary winding and regulate the output direct voltage, said apparatus comprising a control device adapted to control said switch determining the on time period and the off time period of the switch so to maintain constant the output current to supply said LED diodes, the dimmer comprising a TRIAC, characterized by comprising detection means connected to the secondary winding of the transformer and adapted to detect the conduction angle of the TRIAC, said control device being adapted to regulate the output current to supply said LED diodes in response to the TRIAC conduction angle detected by said detection means.

Thanks to the control device the LED current can be regulated continuously by TRIAC in the whole dimming range including very low dimming level.

BRIEF DESCRIPTION OF THE SEVERAL VIEWS OF THE DRAWINGS

The features and advantages of the present disclosure will become apparent from the following detailed description of one embodiment thereof, illustrated only by way of non-limitative example in the annexed drawings, in which.

DETAILED DESCRIPTION

Figure 1:
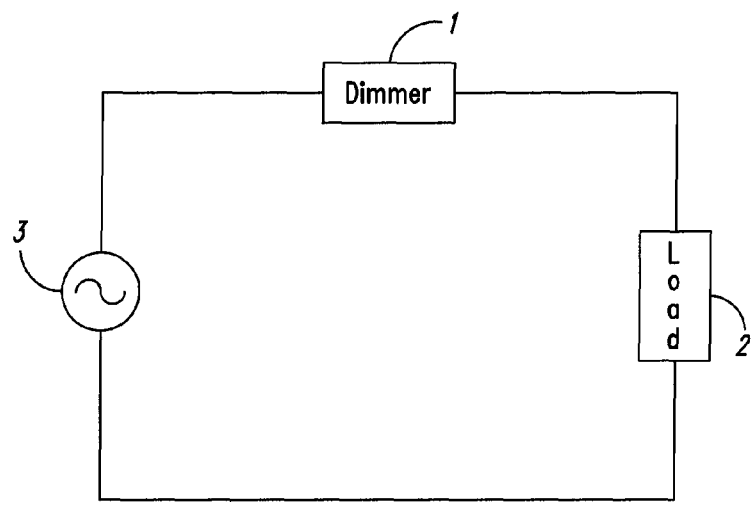
FIG. 1 is a scheme of a dimmer in series to between a power source and a load.
Figure 2:
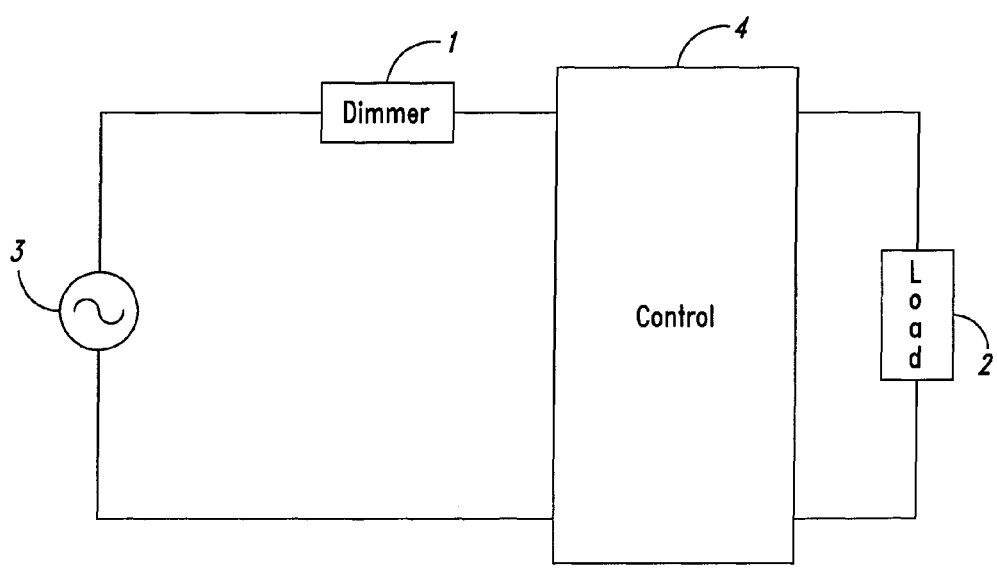
FIG. 2 is a scheme of a control apparatus for LED diodes with a dimmer according to prior art.
Figure 3:
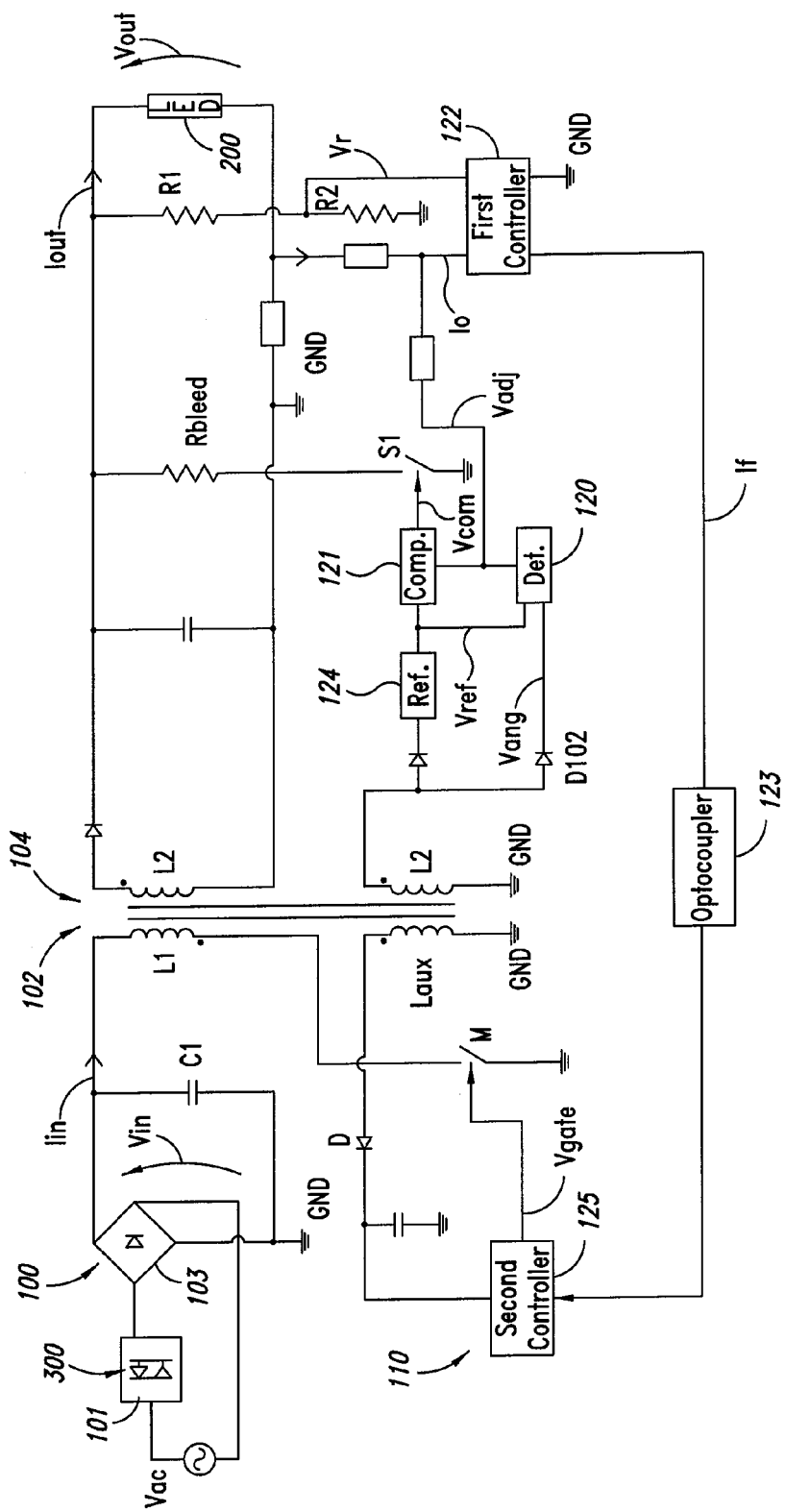
FIG. 3 is a circuit scheme of a control apparatus for LED diodes according to the present disclosure.

In FIG. 3 it is shown a control apparatus 100 for LED diodes 200 comprising a dimmer 101 electrically connected in series between a power supply Vac and a LED lighting converter 102. The converter 102 has input terminals coupled with the dimmer 101 and outputs a direct output voltage Vout with a constant output current Iout to supply said LED diodes 200. The converter, a AC-DC converter and preferably a flyback converter, comprises a rectifier 103, for example a diode bridge and a capacitor C1 coupled between the output terminal of the rectifier 103 and ground GND; a voltage Vin is across the terminals of the capacitor C1. The converter 102 comprises a transformer 104 with a primary winding L1 coupled with the voltage Vin and though which a current Iin flows and a secondary winding L2 coupled with the direct output voltage Vout. The converter 102 comprises a switch M, for example a power MOS, coupled to the primary winding L1 to regulate the current Iin flowing through the primary winding and so as to regulate the output direct voltage Vout. The apparatus comprises a control device 110 adapted to control said switch M, determining the on time period Ton and the off time period Toff of the switch M so to maintain constant the output current Iout to supply said LED diodes 200. The dimmer comprises a TRIAC 300 and the apparatus comprises a detector 120 adapted to detect the conduction angles of the TRIAC 300 and connected to the secondary winding L2 of the transformer. The control device is adapted to regulate the output current Iout to supply said LED diodes in response to the TRIAC angle position detected by said detector 120. In this way the brightness of the LED diodes 200 varies linearly with the TRIAC conduction angle.

The detector 120 is coupled with a reference voltage Vref to transform each detected TRIAC angle position Vang into a DC voltage level Vadj. The voltage Vang is provided by a diode D102 connected to the secondary winding L2; the current flowing through the secondary winding L2 of the transformer provides the conduction angles of the dimmer 103 during the off time Toff of the transistor M.

The apparatus comprises a resistor Rbleed and a controller, including elements S1, 121, adapted to connect or disconnect the resistor Rbleed in parallel to the LED diodes 200 as a function of the value of said output current Iout of the converter.

The control device 110 in FIG. 3 comprises a first control circuit 122 and a second control circuit 125. The first control circuit 122 has a first input coupled to a midpoint of a voltage divider that includes resistors R1, R2, a second input coupled to an output of the detector 120, and an output. The first input receives a voltage Vr=R2*Vout/(R1+R2) and the second input receives a current Io. The current Io is a current proportional to the current Iout and to the voltage Vadj. The control circuit 122 sends a feedback signal Vf to the second control circuit 125 through an optocoupler 123. The second control circuit 125 drives the transistor M in response to the current signal If. Preferably the apparatus comprises an auxiliary winding Laux coupled with the winding L1 to provide a secondary current representative of the current Iin passing through L1; the circuit block 125 is coupled to the auxiliary winding Laux via a diode D and thus receives a signal representative of the zero crossing of the current Iin passing through L1.

The voltage Vout on the LEDs 200 is transformed during the off time period Toff of the switch M. The voltage Vang at the input of the detector 120 is a continuous voltage if the dimmer 101 is not present and is discontinuous if the dimmer 101 exists. The voltage Vang is detected by the detector 120 which converts the voltage Vang to a DC voltage Vadj by means of the reference voltage Vref produced by a reference voltage generator 124. The first controller 122 uses the voltage Vadj to modulate the current feedback If.

A comparator 121 has first and second inputs coupled respectively to the outputs of the detector 120 and reference voltage generator 124 to compare the voltage Vadj with a threshold voltage Vth that is based on the reference voltage Vref. If the voltage Vadj is higher than a threshold voltage Vth, the comparator 121 turns on the switch S1 by means of the signal Vcom which places the resistor Rbleed in parallel to the load 200. This occurs if the output current Iout is at low level, that is when the dimmer 101 sets at minimum brightness. In the last case, the presence of the resistor Rbleed provides an additional power that keeps the TRIAC 300 in the on state, that is the TRIAC current is higher than its holding current. For these reasons the resistor Rbleed has a suitable value that causes the TRIAC current to be higher than the holding current of the TRIAC 300.

Figure 4:
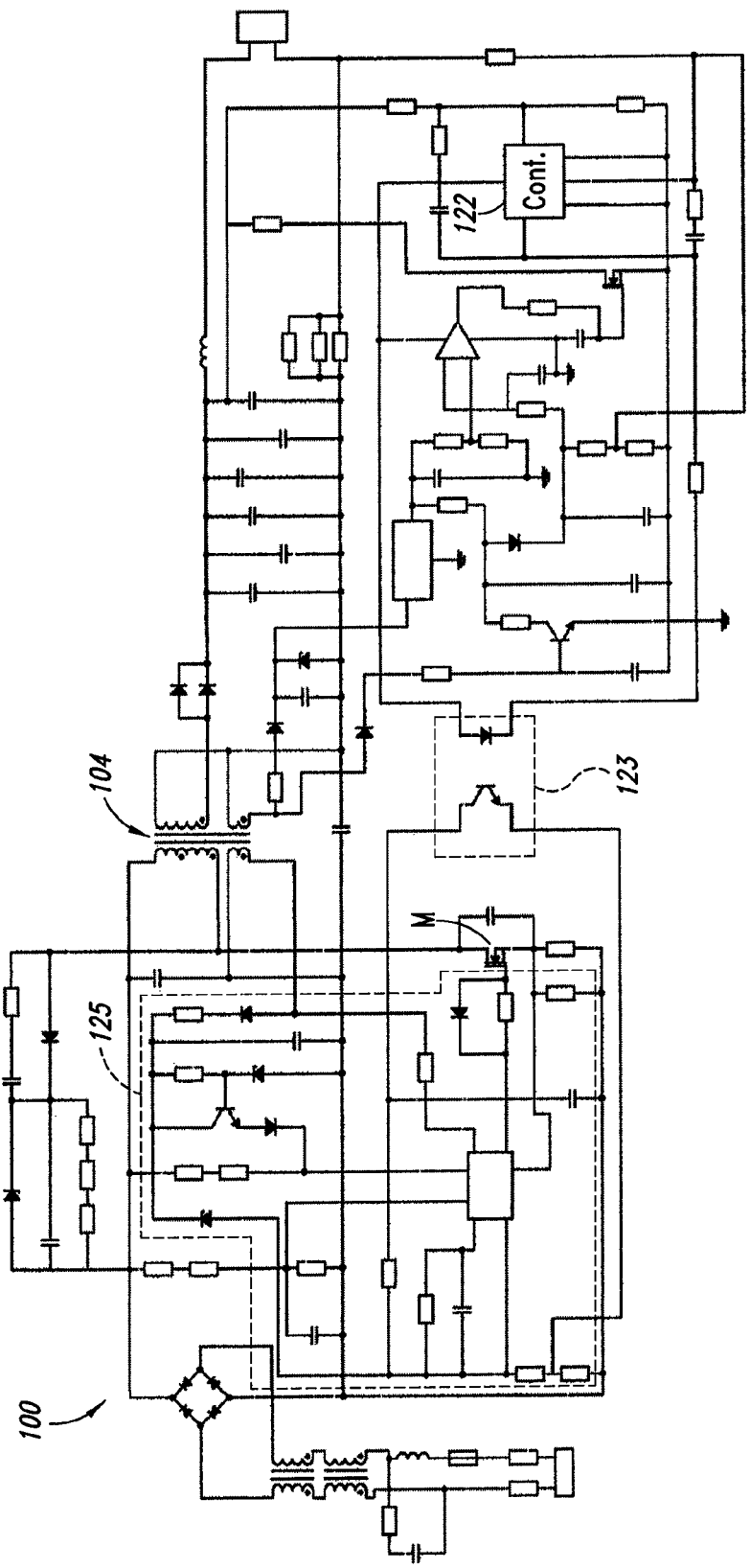
FIG. 4 is an circuital implementation of the control apparatus for LED diodes in FIG. 3.

FIG. 4 shows a circuit implementation of the control apparatus 100.

Figure 5:
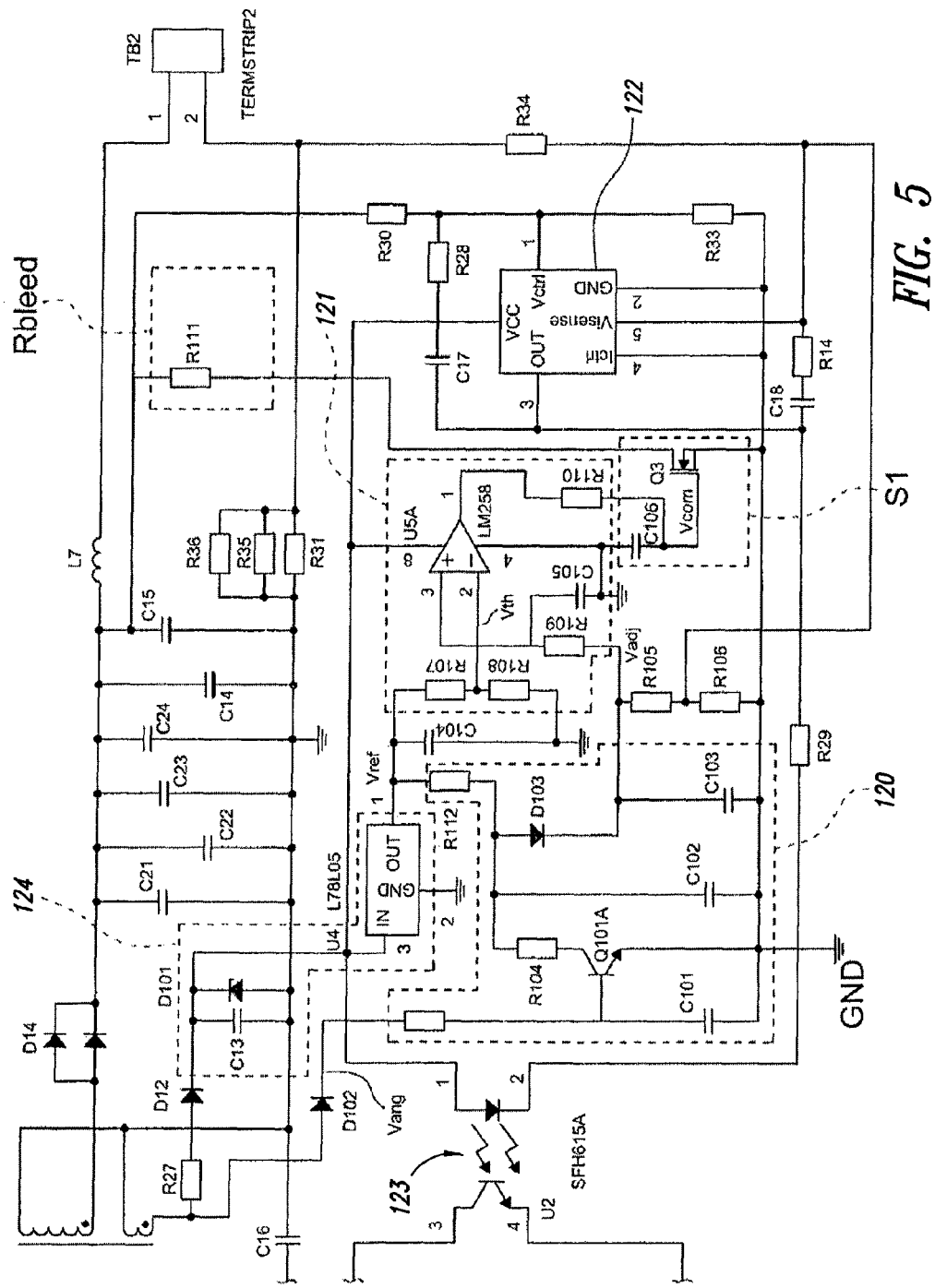
FIG. 5 shows a part of the circuital implementation of the control apparatus for LED diodes in FIG. 4.

FIG. 5 shows a circuit implementation of a part of the control apparatus 100 according to the disclosure, particularly the circuit part connected to the secondary side of the apparatus in FIG. 4. The more important circuit blocks are shown in dotted lines. Particularly the detector 120 comprise a bipolar transistor Q101A with the emitter terminal connected to ground GND and the base terminal driven by the voltage Vang. A capacitor C101 is connected between the base and emitter terminals of the transistor Q101A. A series of two resistances R104 and R112 is connected between the collector terminal of the transistor Q101A and the voltage Vref; a capacitor C102 is connected between the common terminal of the resistances R104 and R112. The anode of a diode D103 is connected to the common terminal of the resistances R104 and R112 and the cathode is connected to a capacitor C103 having the other terminal connected to the emitter terminal of the transistor Q101A; the voltage at the terminals of the capacitor C103 is the voltage Vadj.

The threshold voltage Vth is provided by a fraction of the voltage Vref by means of a resistor divider R107, R108.

FIGS. 6-9 show time diagrams of the input current Iin, the output current Iout and the voltage Vadj in different operation conditions of the dimmer.

Figure 6:
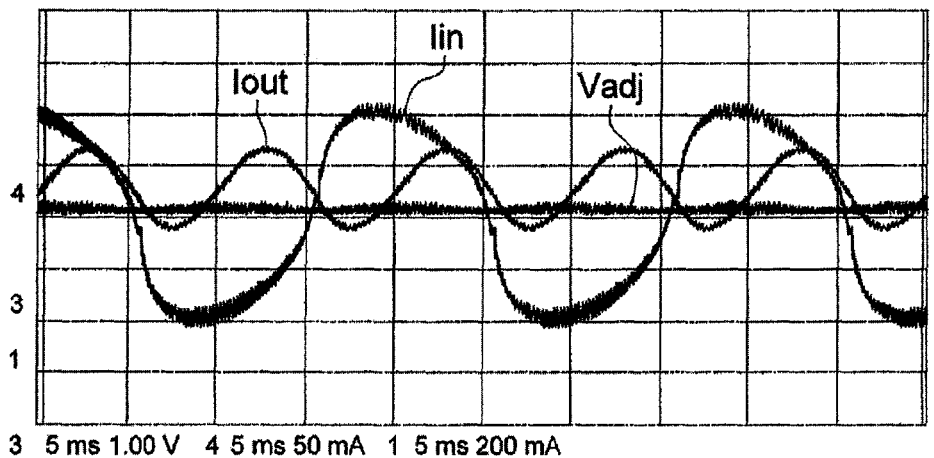
FIGS. 6-9 are time diagrams of some signals of the control apparatus in FIG. 4.

FIG. 6 shows the situation wherein the dimmer 101 is not connected; in this case the output current or LED current Iout is 714 mA and Vadj=2.14 Volt.

Figure 7:
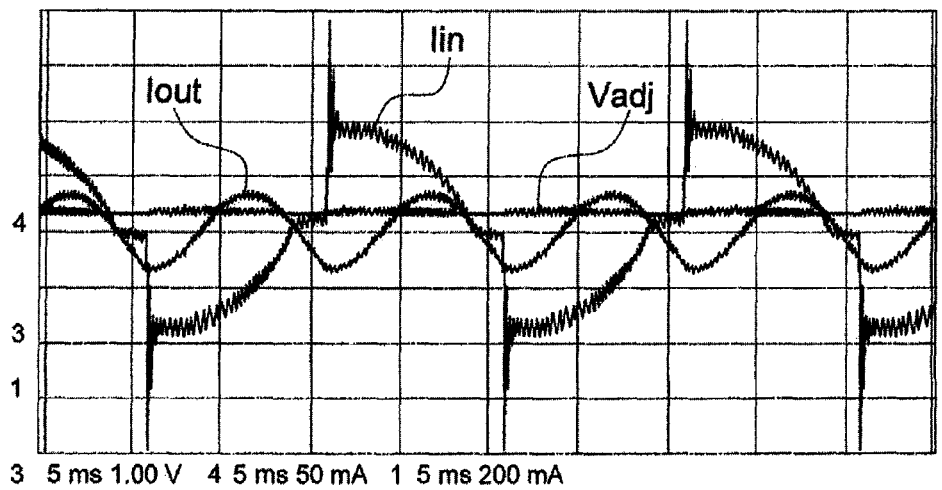

FIG. 7 shows the situation wherein the dimmer 101 is connected and the TRIAC 300 sets the maximum power; in this case the output current or LED current Iout is 620 mA and Vadj=2.34 Volt.

Figure 8:
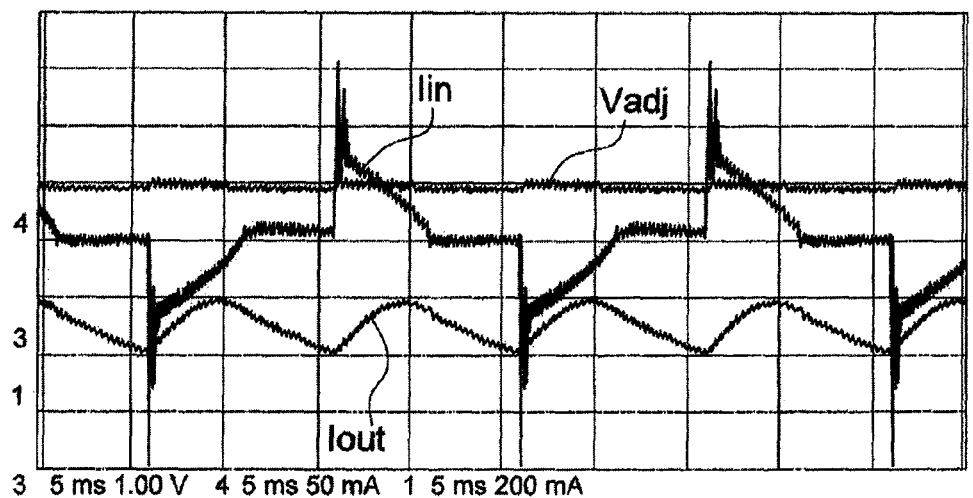

FIG. 8 shows the situation wherein the dimmer 101 is connected and the TRIAC 300 sets the half power; in this case the output current or LED current Iout is 304 mA and Vadj=2.9 Volt.

Figure 9:
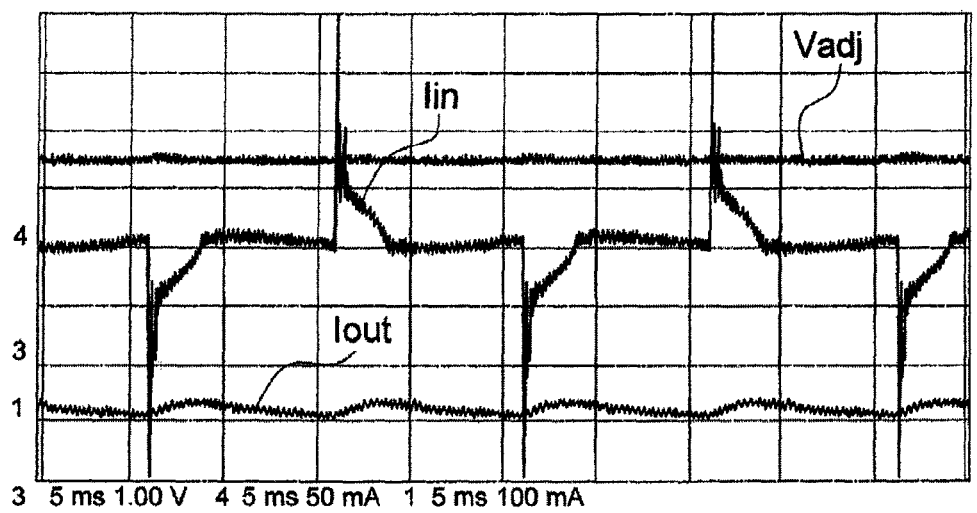

FIG. 9 shows the situation wherein the dimmer 101 is connected and the TRIAC 300 sets the minimum power; in this case the output current or LED current Iout is 22 mA and Vadj=3.4 Volt. In this case the resistor Rbleed is connected in parallel to the LED diodes 200.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control apparatus for LED diodes, comprising:
    a dimmer having a TRIAC and an input configured to be electrically coupled to a power supply;
    an LED lighting converter configured to output a direct output voltage with a constant output current to supply said LED diodes, said converter including:
        an input terminal coupled to the dimmer;
        an output configured to provide the output voltage;
        a transformer with a primary winding coupled with the input terminal and a secondary winding coupled with the output; and
        a switch coupled to the primary winding and configured to regulate current through the primary winding and regulate the output voltage; and
    a control device configured to control said switch and determine an on time period and an off time period of the switch to maintain constant an output current to supply said LED diodes, the control device including detection means, coupled to the secondary winding of the transformer, for detecting a conduction angle of the TRIAC and providing a detection output, said control device being configured to regulate the output current to supply said LED diodes in response to the detection output.

2. An apparatus according to claim 1, comprising a reference voltage generator configured to provide a reference voltage, said detection means being coupled with the reference voltage generator and being for transforming each detected TRIAC conduction angle into a DC voltage level.

3. An apparatus according to claim 1, comprising a resistor and further means for connecting and disconnecting said resistor in parallel to the LED diodes based on the detection output.

4. An apparatus according to claim 3, wherein the resistor has a value suitable to draw sufficient power to keep the TRIAC in an on state.

5. An apparatus according to claim 3, comprising a reference voltage generator configured to provide a reference voltage, said detection means being coupled with the reference voltage generator and being for transforming each detected TRIAC conduction angle into a DC voltage level, wherein the further means are for connecting the resistor in parallel to the LED diodes in response to detecting that the DC voltage level is higher than a voltage threshold.

6. An apparatus according to claim 1, comprising a reference voltage generator configured to provide a reference voltage, said detection means being coupled with the reference voltage generator, being for transforming each detected TRIAC conduction angle into a DC voltage level, and including:
- a first diode coupled to the secondary winding of the transformer;
- a bipolar transistor having an emitter terminal coupled to ground, a base terminal coupled to said first diode, and a collector terminal coupled to an output of the reference voltage generator;
- a second diode and a capacitor coupled together between the collector and emitter terminals of the transistor, the detection means being for providing a voltage across the capacitor as the DC voltage level.

7. An apparatus according to claim 1, comprising:
- a resistance and switch coupled together between the output of the LED lighting converter and ground; and
- a comparator configured to compare the detector output with a reference voltage, turn on the switch based on a first result of the comparison between the detector output and the reference voltage, and turn off the switch based on a second result of the comparison between the detector output and the reference voltage.

8. A control apparatus for LED diodes, comprising:
- a dimmer having a TRIAC and an input configured to be electrically coupled to a power supply;
- an LED lighting converter configured to output a direct output voltage with a constant output current to supply said LED diodes, said converter including a transformer with a primary winding and a secondary winding;
- a detector coupled to the secondary winding of the transformer and configured to detect a conduction angle of the TRIAC and provide a detection output voltage;
- a resistance and switch coupled together between an output of the LED lighting converter and ground; and
- a comparator configured to compare the detector output voltage with a reference voltage, turn on the switch based on a first result of the comparison between the detector output voltage and the reference voltage, and turn off the switch based on a second result of the comparison between the detector output voltage and the reference voltage.

9. An apparatus according to claim 8, comprising a reference voltage generator configured to provide the reference voltage, said detector having a first input coupled to the secondary winding, a second input coupled to an output of the reference voltage generator, and an output at which the detector is configured to provide the detection output voltage based on the detected conduction angle and the reference voltage.

10. An apparatus according to claim 8, wherein the resistance has a value suitable to draw sufficient power to keep the TRIAC in an on state.

11. An apparatus according to claim 8, wherein said detector includes:
- a first diode coupled to the secondary winding of the transformer;
- a bipolar transistor having an emitter terminal coupled to ground, a base terminal coupled to said first diode, and a collector terminal configured to receive the reference voltage;
- a second diode and a capacitor coupled together between the collector and emitter terminals of the transistor, the detector being configured to provide a voltage across the capacitor as the detection output voltage.

12. A lighting apparatus, comprising:
LED diodes;
- a dimmer having a TRIAC and an input configured to be electrically coupled to a power supply;
- an LED lighting converter configured to supply the LED diodes with a direct output voltage, said converter including a transformer with a primary winding and a secondary winding;
- a detector coupled to the secondary winding of the transformer and configured to detect a conduction angle of the TRIAC and provide a detection output voltage;
- a resistance and switch coupled together between an output of the LED lighting converter and ground; and
- a comparator configured to compare the detector output voltage with a reference voltage, turn on the switch based on a first result of the comparison between the detector output voltage and the reference voltage, and turn off the switch based on a second result of the comparison between the detector output voltage and the reference voltage.

13. A lighting apparatus according to claim 12, comprising a reference voltage generator configured to provide the reference voltage, said detector having a first input coupled to the secondary winding, a second input coupled to an output of the reference voltage generator, and an output at which the detector is configured to provide the detection output voltage based on the detected conduction angle and the reference voltage.

14. A lighting apparatus according to claim 12, wherein the resistance has a value suitable to draw sufficient power to keep the TRIAC in an on state.

15. A lighting apparatus according to claim 12, wherein said detector includes:
- a first diode coupled to the secondary winding of the transformer;
- a bipolar transistor having an emitter terminal coupled to ground, a base terminal coupled to said first diode, and a collector terminal configured to receive the reference voltage;
- a second diode and a capacitor coupled together between the collector and emitter terminals of the transistor, the detector being configured to provide a voltage across the capacitor as the detection output voltage.

* * * * *